United States Patent Office 3,187,497
Patented June 8, 1965

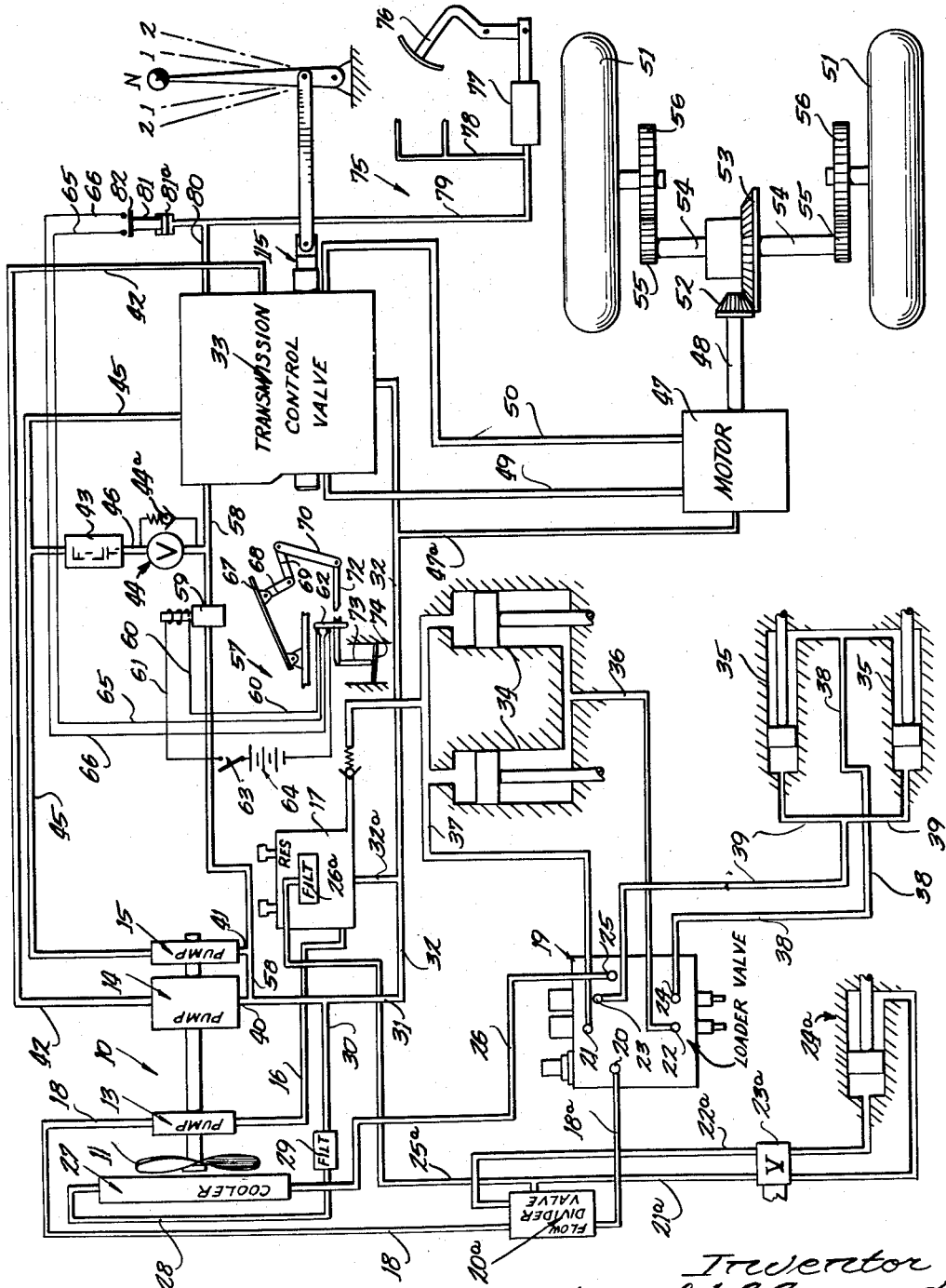

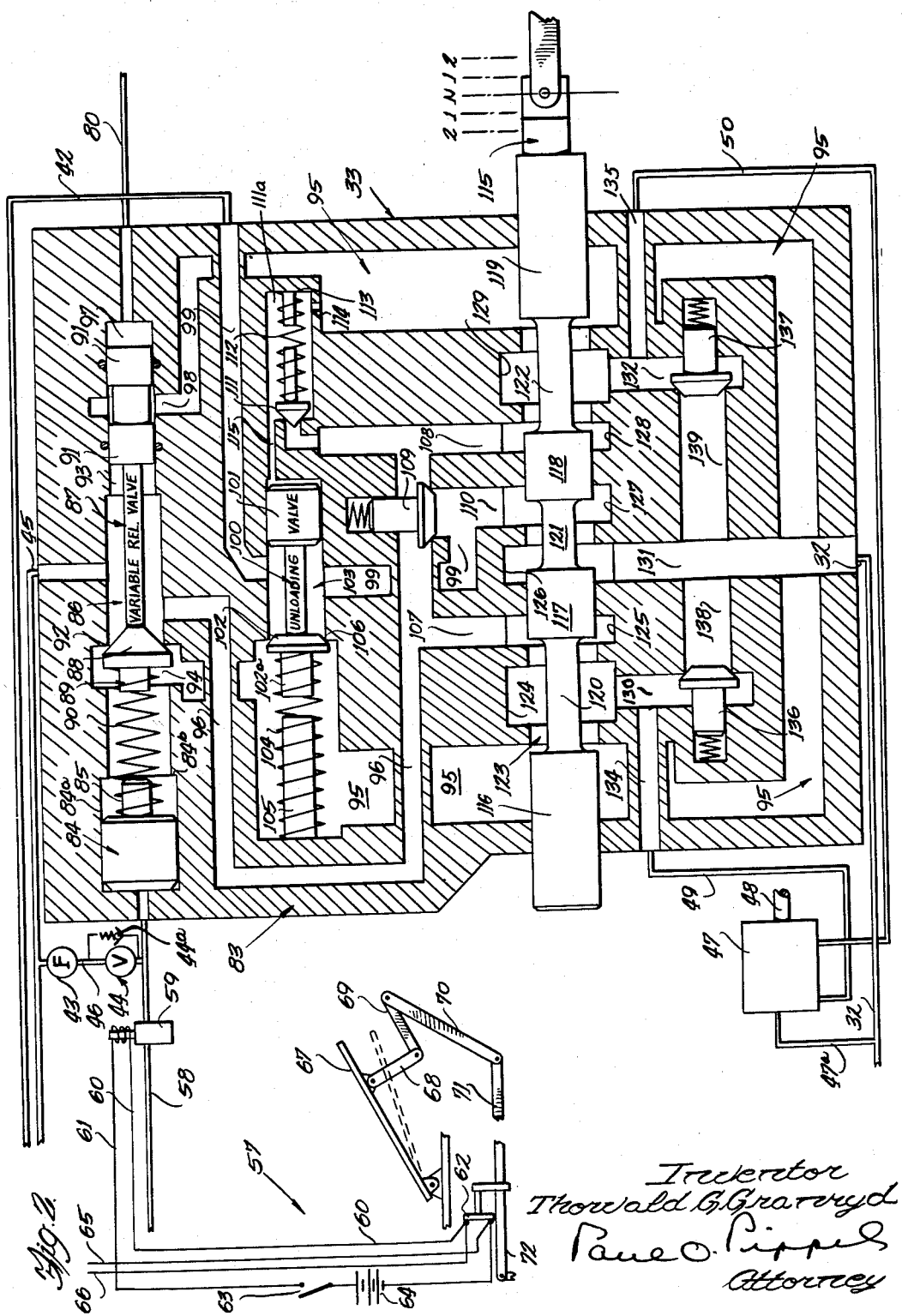

3,187,497
HYDROSTATIC ARRANGEMENT FOR
TRACTOR LOADERS
Thorvald G. Granryd, Libertyville, Ill., assignor to
The Frank G. Hough Co., a corporation of Illinois
Filed May 4, 1962, Ser. No. 192,481
18 Claims. (Cl. 60—19)

This is a continuation-in-part of applicant's co-pending application Serial No. 120,412, filed June 28, 1961, now Patent No. 3,148,502, issued September 15, 1964.

This invention relates generally to tractor loaders and more specifically to improvements in a hydrostatic transmission arrangement in combination with the loader hydraulic system of a tractor loader.

It is the object of the present invention to provide for a maximum utilization of the available horsepower of the engine in a front end type tractor loader wherein the wheels are driven by an improved hydrostatic arrangement and wherein the tool means of the tractor loader are hydraulically operated.

A further object of the present invention is to provide a dual pump arrangement for an improved hydrostatic arrangement of a tractor loader in combination with the tool hydraulic system and with certain novel transmission control valve means providing for the utilization of substantially the maximum available engine power for propulsion and acceleration of the tractor when the tractor is in the travel speed range, and reduced but sufficient propulsion power with high tractive effort when the tractor is operated in the low speed range and the loader thereof is simultaneously being operated at its maximum capacity.

Another object of the present invention is to provide a hydrostatic drive arrangement for a tractor loader, which will automatically and simultaneously provide adequate available tractive effort and crowding speed while the tractor loader is digging its load, yet while it is digging being capable of transmitting only a certain portion of maximum available engine horsepower for the purpose of also simultaneously providing adequate hydraulic tool loader performance. However, while the tractor loader is traveling at its travel or non-loading speed, the hydrostatic arrangement has automatically become capable of transmitting all of the available engine horsepower for the purpose of obtaining optimum acceleration and grade ability characteristics.

Another object of the present invention is to provide a dual pump arrangement for an improved hydrostatic drive arrangement of a tractor loader in combination with the tool hydraulic system and with certain novel transmission control valve means wherein one of the novel transmission control valve means is a relief valve means including operator control means for varying the relief pressure from a predetermined minimum value to a maximum value. Further another novel transmission control valve means is an unloading valve means which provides an unloading pressure substantially lower than the maximum relief pressure of the one relief valve means such that these two valve means, the variable relief valve means and unloading valve means, function to provide substantial utilization of the maximum available engine power for propulsion and acceleration of the tractor without stalling the engine when the tractor is in the travel speed range or in the low speed range with the high tractive effort and the loader thereof is simultaneously being operated at its maximum capacity.

Another object of the present invention is to provide a dual pump arrangement for an improved hydrostatic drive arrangement of a tractor loader in combination with the tool hydraulic system and with certain novel transmission control valve means wherein one of the novel control valve means is an operator selector valve positionable in the low or travel speed range and the forward or reverse direction. The novel transmission control valve means further provides an unloading valve means and a relief valve means which includes a throttle control and a brake control. The relief valve means is variable from a minimum to a maximum relief pressure and vice versa through operation of the brake and throttle control. Positioning of the selector valve in the travel speed range provides utilization of the dual pump arrangement for driving the traction means through the improved hydrostatic arrangement such that operation of the brake control actuates brake fluid to externally open the relief valve means to automatically disconnect the novel transmission control valve from the hydrostatically driven traction means. The externally opened relief valve means vents both pumps therethrough. While positioning of the selector valve in the low speed range provides utilization of one of the dual pumps for driving the traction means through the improved hydrostatic arrangement such that operation of the break control actuates brake fluid to externally open the relief valve means to automatically disconnect the novel transmission control valve from the hydrostatically driven traction means. The externally opened relief valve means vents the utilized one of the dual pumps therethrough.

A further object of the present invention is to provide a dual pump arrangement for an improved hydrostatic drive arrangement of a tractor loader in combination with the tool hydraulic system and with certain novel transmission control valve means, namely, an operator selector valve positionable in the low or travel speed range and the forward or reverse direction. The novel transmission control valve means further includes an unloading valve means. Even though the selector valve is selectively positioned in the travel range for driving the traction means by the dual pump arrangement the unloading valve means vents the pressure fluid of one of the dual pumps to prevent stalling of the engine during sudden loadings or obstructions on the driven traction means of the tractor loader. Venting of one of the pressure fluid pumps automatically down shifts the novel transmission control valve means to the low speed range without shifting or loading shock. Upon diminishment of the loading or obstruction, the novel transmission control valve means automatically reconnects the vented pump without shifting shock to re-establish the selected travel speed range of the selector valve of the driven traction means.

Other objects and features of the invention will be apparent upon a perusal of the following specification and drawings, of which:

FIGURE 1 is a diagrammatic view of a portion of a tractor loader constructed according to the present invention; and FIGURE 2 is a diagrammatic view of the subject invention including an enlarged cross sectional view of the improved hydrostatic transmission control valve.

The present embodiment is the preferred embodiment, but it is to be understood that changes can be made in the present embodiment by one skilled in the art without departing from the spirit and scope of the present invention.

Generally, the invention comprises a large pump and a substantially smaller pump connected to be continuously driven by the engine of a front end type tractor loader. The output of both of the pumps is delivered to an improved transmission control valve, and the improved transmission control valve in turn is connected to a hydrostatic motor for driving the tractor. The motor may be connected by any suitable means known in the art to the wheels of the tractor. A third pump is provided for operating the loader portion of the tractor loader and that pump is also continuously driven by the engine of the tractor. The loader hydraulic system includes a hydraulic pump, hydraulic valve and hydraulic rams or motors for operating the tool of the loader, a flow divider for the power steering circuit, and a cooler and filter which will continuously cool and filter a substantially constant portion of the hydraulic fluid. The improved hydrostatic transmission system and the hydraulic system of the loader use a common reservoir.

The control valve for the improved hydrostatic transmission arrangement has one valve spool, which provides for forward and reverse operational speeds of the tractor at low and high range positions and includes a neutral position. In the high range position of the valve spool, the output of the transmission pumps is delivered to the hydrostatic motor; and in the low range position of the valve spool, the larger displacement pump of the two hydrostatic pumps is vented and the smaller displacement pump is connected to drive the hydrostatic motor.

The improved transmission control valve further includes an unloading valve means which provides a certain unloading pressure when the tractor is traveling in the high speed range while receiving pressurized fluid from both transmission pumps to prevent engine stalling in the traveling speed range. A relief valve permitting variable relief pressure in the improved transmission control valve further provides a relatively high relief pressure when the tractor is operating in the low speed range. This relatively high relief pressure provides for the development of maximum obtainable tractive effort while simultaneously using the loader pump to dig or load in the low speed range. When the tractor is operating in the low speed range and the loader pump is operating to develop the maximum pressure permitted by a pressure relief valve in the loader control valve, the power developed by the small transmission pump, as determined by its flow and maximum pressure, plus the power developed by the loader pump, as determined by its flow and maximum pressure, substantially equals the maximum available power of the engine. Thus a novel balanced power system is provided for a front end type tractor loader.

Operator controls are provided to vary the relief pressure of the relief valve means. One of the operator controls, a throttle control arrangement operable from an idle position to an operative position and vice versa provides variation of the relief pressure of the relief valve means from a predetermined minimum value to a maximum value. The other of the operator controls, a brake control arrangement being operable to vary the maximum relief pressure to the minimum relief pressure is also operatively associated with the throttle control arrangement. The variation at a controlled rate of the relief pressure of the relief valve means reduces shifting shocks during selective operation of the control valve and reduces loading shocks during sudden loadings of the traction wheels operating over the speed ranges of the tractor loader.

For a detailed description of the present invention, reference is made to the drawings. Although only portions of a tractor loader to which it is intended that the invention be applied are shown, the remaining necessary structure to provide a working tractor loader may be easily understood from the tractor loader shown in my prior Patent No. 2,842,273, issued July 8, 1958. The tractor engine 10 is carried on the frame of the tractor (not shown) and includes a conventional fan 11 and radiator (not shown). Any suitable means known in the art are used to drive the pumps 13, 14 and 15 from the engine in FIGURE 1. The hydraulic pump 13 is the hydraulic pump for the loader portion of the tractor loader. The hydraulic pumps 14 and 15 are the hydrostatic transmission pumps of the large subject invention. The transmission pump 14 is a relatively large displacement pump, substantially larger than the smaller transmission pump 15. In one reduction to practice of the present invention, a pump 14 which had a displacement of approximately five times the displacement of the small pump 15 was found to provide a satisfactory working arrangement.

The suction side of the loader pump 13 is connected by a hydraulic fluid conduit 16 to the hydraulic fluid reservoir 17. The pressure side of the pump 13 is connected by a hydraulic fluid conduit 18 to the flow divider 20a for the power steering circuit and the loader circuit. Conduit 18a, connected at one end to the flow divider 20a, connects at the other end the pressure side of pump 13 from conduit 18 to the loader control valve 19. The loader control valve 19 is of the open center type and may be of any suitable construction known in the art. The loader control valve is provided with ports 20, 21, 22, 23, 24 and 25, with port 20 being connected to conduit 18a. For the present description it is sufficient to note that the loader control valve 19 includes valve spools positionable in a neutral position and various operated positions on each side of the neutral position. When the valve spools are in the neutral position, any hydraulic fluid entering port 20 is directed through the valve 19 to port 25. When either of the spools are operated to one of the operated positions on either side of the neutral position any hydraulic fluid entering port 20 is directed to one or more of the ports 21, 22, 23 and 24, while the remaining ports are connected to port 25. Port 25 is connected to one end of conduit 26, the other end of which is connected to the input side of the cooler 27. The hydraulic fluid cooler 27 may be of any suitable type known in the art and is physically mounted in cooperation with the fan of the engine 10 for cooling the hydraulic fluid passing therethrough. The output side of the cooler 27 is connected by conduit 28 to the input side of the hydraulic fluid filter 29. The hydraulic fluid filter 29 may also be of any suitable type known in the art. The output side of the filter 29 is connected to one end of a hydraulic fluid conduit 30. The other end of conduit 30 is connected to one end of conduit 31, and the other end of conduit 31 is connected into the hydraulic fluid conduit 32. One end of conduit 32 through branch conduit 32a is connected into the reservoir 17, and the other end of conduit 32 is connected to a port of the transmission control valve 33.

The hydraulic rams or motors 34 and 35 are provided for operating the loader mechanism in a manner such as shown in my aforementioned patent. The rod end of hydraulic ram 34 is connected by hydraulic fluid conduit 36 to port 22 of the loader control valve 19. The head end of hydraulic ram 34 is connected by hydraulic fluid conduit 37 to port 21 of valve 19. The rod end of hydraulic ram 35 is connected by conduit 38 to port 24 of valve 19; and the head end of ram 35 is connected by conduit 39 to port 23 to valve 19.

Referring to the power steering circuit, conduits 21a and 22a at one end are connected to the flow divider 20a of any suitable construction receiving pressure fluid from conduit 18. A steering valve 23a of any suitable construction under the control of the operator is connected to the other end of conduits 21a and 22a Depending upon the selected position of the steering valve 23a, pressure fluid is directed to either side of the piston in the steering cylinder 24a through the connecting conduits (not indicated). Pressure fluid is returned to the reservoir 17 through conduit 25a, connected at one end to conduit 21a, to filter 26a located in reservoir 17. The power steering circuit has been described to show the complete hydraulic circuit but forms no important part of the subject invention.

The suction side of the large transmission pump 14 is connected by conduit 40 to conduit 31, and the suction side of the small transmission pump 15 is connected by conduit 41 to conduit 58 which connects at one end to conduit 40. The pressure side of transmission pump 14 is connected by hydraulic fluid conduit 42 to the transmission control valve 33. The pressure side of the transmission pump 15 is connected by conduit 45 into the control valve 33. Intermediate the ends of pressure conduit 45, a branch pressure conduit 46 is connected and at the other end it is connected to conduit 58 that forms part of a variable relief valve in the control valve 33. Filter 43 and pressure compensated flow control valve 44 with a built-in check valve 44a are series connected in conduit 46 to provide respectively a filtered pressure flow and a controlled rate of flow to the conduit 58. The purpose of the built-in check valve 44a in the valve 44 is only to provide flow of fluid from conduit 58 to conduit 45. The flow of pressure fluid through the check valve 44a occurs primarily when a directional shift of valve spool 115 causes hydrostatic motor 47 to act, in effect, as a pump temporarily. Further valve 44 including its check valve 44a may be of any suitable construction known in the art.

The hydrostatic motor 47 for operating the traction members of the tractor may be of any suitable type known in the art and will rotate its output shaft 48 in either direction dependent upon the direction of flow of hydraulic fluid through the motor 47. One side of the motor 47 is connected by conduit 49 to the transmission control valve 33 and the other side of the motor 47 is connected by conduit 50 to the transmission control valve 33. Any leakage fluid in motor 47 is relieved through conduit 47a. The output shaft 48 of the motor 47 is connected by any suitable means to drive the traction members of the tractor. In the present embodiment, both wheels 51 of the tractor are shown, and the output shaft 48 drives a bevel gear 52, in turn, driving another bevel gear 53 which may form part of a differential gearing arrangement. The bevel gear 53 in turn drives the shaft 54 which in turn drives a gear 55, which in turn meshes with gear 56. Gear 56 is connected to drive the wheel 51.

The transmission control valve 33 which is shown in an enlarged cross-sectional view in FIGURE 2, comprises a housing 83 with one valve spool 115 slidably carried therethrough. Valve spool 115 is provided with lands 116, 117, 118 and 119, and annular grooves for reduced portions 120, 121 and 122. The valve spool 115 is provided with a hole at the extended end portion thereof for connection of a manual operator thereto (not indicated) for sliding the valve spool 115 in is valve bore or chamber as shown in FIGURE 1. With the valve spool in neutral position as shown in FIGURE 1 pressure fluid from conduit 45 flows through chamber 86, passageway 96 to passageways 107 and 108. Passageway 107 is in free fluid communication with motor conduit 49 through annular grooves 125 and 124, passageways 130 and 134 and in free fluid communication with return passageway 95 through annular grooves 124 and 123. Passageway 108 is in free fluid communication with motor conduit 50 through annular grooves 128 and 129 and passageways 132 and 135 and in free fluid communication with return passageway 95 through annular grooves 128 and 129. Pressure fluid from the large displacement pump 14 is in free fluid communication with the reservoir 17 through conduit 42 to passageway 99 and chamber 103, passageway 110, annular grooves 127 and 126 to passageway 131 and return conduit 32 through fluid connected annular grooves 126 and 127. When the valve spool is shifted to the right from the position shown in FIGURE 2 for the number one position and low speed forward range, pressure fluid from conduit 45 flows through passageways 96 and 107 into fluid connected annular grooves 125, 124, to passageways 130 and 134 through conduit 49 to drive motor 47. Return pressure fluid from motor 47 passes through motor conduit 50 via passageways 135 and 132, annular groove 129, passageway 95 and 131 to return conduit 32. Then when the valve spool is shifted to the left from the position shown in FIGURE 3 to the number one reverse position or low speed reverse position, fluid under pressure from pump 15 flows through conduit 45 to chamber 86, passageway 96 and 108, annular grooves 128 and 129, passageways 132 and 133 and conduit 50 to drive the motor 47. Return fluid from motor 47 flows through motor conduit 49, passageways 134 and 130, annular groove 124, passageway 95 and passageway 131 to return conduit 32. In either low speed range position forward or reverse, pressure fluid from the large displacement pump 14 through conduit 42 communicates freely from passageway 99, passageway 110, annular grooves 126 and 127, and passageway 131 to return conduit 32 since reduced portion 121 of the valve spool 115 is of sufficient length to maintain annular grooves 126 and 127 in free fluid communication during the low speed range. Further the check valve 109 when valve spool 115 is in either low speed position is closed.

Considering next the travel or high speed range of the vehicle, the valve spool is moved to the far right in FIGURE 2 or the second forward position in which the pressure fluid from both pumps 14 and 15 is combined in parallel to drive the hydrostatic motor 47. In the second forward position pressure fluid conduit 45 flows through passageway 96 to passageway 107 to drive the motor 47 from conduit 49 which is in fluid communication with passageway 107 through fluid connected annular grooves 124 and 125 and connecting passageways 130 and 134. Pressure fluid from the large pump 14 flowing from conduit 42 connects via passageway 99 with passageway 110 which is blocked off from passageway 131 by annular land 117 thus preventing fluid communication from annular groove 127 to annular groove 126 thereby opening check valve 109 to communicate passageway 110 with passageway 96 and thereby connect pump 14 with passageway 107 to supply the additional pressure fluid for the high speed range. Return pressure fluid from motor conduit 50 is connected to return conduit 32 through passageways 135 and 132 in free fluid communication with return passageway 95 through fluid connecting annular groove 129. Annular land 118 in the second forward position prevents fluid communication of passageway 108 with annular groove 129. With the valve spool 115 shifted to the extreme left position, from the position shown in FIGURE 2 the second travel speed range or reverse speed of hydrostatic motor 47 is obtained. Pressure fluid from conduit 45 is in communication with motor conduit 50 through passageways 96 and groove 128 and connecting passageways 132 and 135. Pressure fluid from the large displacement pump 14 flows from conduit 42 through passageway 99, passageway 110, opening check valve 109 to combine with pressure fluid from small pump 15 in passageway 108 which as previously mentioned communicates with conduit 50. Pressure fluid in passageway 110 does not communicate with passageway 131 since annular land 118 prevents free fluid communication from annular groove 127 to 126. Return pressure fluid from motor 47 is passed from conduit 49 to return passageway 95 through connecting passageways 134 and 130 to annular groove 124 which is in free fluid communication with passageway 95. Annular land 117 prevents fluid communication between passageway 107, annular groove 125 and annular groove 124 in the second reverse position of the spool 115. Thus the selected position by the operator of the valve spool directs pressure fluid from passageways 107 and 108 to either side of the motor 47 connected by conduits 49 and 50. Reduced portion 121 cooperates with lands 117 and 118 to permit bypass of the pressure fluid from the large displacement pump 14 in any position of the valve spool 115 other than the high speed ranges.

The throttle control arrangement 57 of the transmission control valve 33 comprises an electrical circuit that includes electrical lines 60 and 61 connected across solenoid valve 59 at one end and at the other end each line is connected to a pair of fixed terminals which are bridged by a movable switch contact 62 associated with the foot pedal 67. The electrical line 61 intermediate its ends is series connected to an ignition switch 63 of the vehicle and to a battery 64 providing respectively control for turning-on the electrical circuit and a power source for the circuit. As shown in FIGURE 1 the foot pedal 67 is operatively connected to the throttle valve 74 in the carburetor through a series of linkages 68, 69, 70, 72 and 73 connected at their ends through suitable means so as to communicate the movement of the foot pedal 67 by the operator to open and close throttle valve 74. Substantially intermediate the ends of the link 72 and fixedly attached in a suitable manner is switch contact 62 that bridges the terminals connecting electrical lines 60 and 61. Pressure fluid from pump 15 flows through conduit 45 through the filter 43 and pressure compensated flow control valve 44 of conduit 46 to conduit 58 that is connected at one end to a variable relief valve designated generally by the reference character 87 of the control valve 33. At the other end of conduit 58 pressure fluid returns to the suction side of pumps 14 and 15. The solenoid valve 59 is located between the ends of the conduit 58 so that when the solenoid valve is energized by the closed electrical circuit the pressure fluid from pump 15 is vented through the open valve 59 in conduit 58 to the suction side of pumps 14 and 15. If the valve 59 is not energized and therefore in its normally closed position pressure fluid from pump 15 is directed by conduit 58 from conduits 45 and 46 to the control valve 33 to increase the variable relief pressure of the relief valve 87. Thus with the foot pedal in the idle position as shown in FIGURES 1 and 2 and the throttle valve 74 substantially closed the switch contact 62 bridges the terminals to complete the electrical circuit across the solenoid valve 59 when the operator ignition switch 63 is closed to energize the valve 59 to open position venting the pressure fluid in conduit 58 from the variable relief valve 87 to the suction side of pumps 14 and 15. However, if the foot pedal 67 is depressed to an operative position such as the broken line of foot pedal 67 in FIGURE 2 by the operator, switch contact 62 is urged away from the terminals by the movement of linkage 72 and solenoid valve 59 being non-energized returns to its normally closed position to increase the pressure of the variable relief valve 87 in control valve 33. As the pressure of the variable relief valve 87 increases, the purpose of the pressure compensated flow control valve 44 is to provide a controlled rate of relief pressure increase in the variable relief valve 87 so that the transmission control valve 33 provides reduced shifting and loading shocks.

The brake control arrangement 75 of the transmission control valve 33 comprises a conventional brake pedal 76 mechanically connected to a master cylinder 77 which in turn fluidly connects the brake system through brake conduits 78 leading to the brake cylinders, not shown. Conduit 79 also connected to the master cylinder 77 at one end is connected at the other end to conduit 80 connected to chamber 97 at one end of the variable relief valve 87 in the control valve 33 and to a fluid pressure switch that comprises cylinder 81a and slidable piston 81 therein. Thus as the operator moves the brake pedal 76 to operate the brakes the brake fluid from the master cylinder 77 is also directed through conduit 79, conduit 80 and chamber 97 to vary the relief pressure of the relief valve 87. Operator movement of pedal 76 also causes brake fluid in conduit 79 to move the switch contact 82 at one end into bridging contact with spaced-apart terminals connecting lines 65 and 66. The other end of electrical lines 65 and 66 are connected to the spaced-apart terminals associated with the switch contact 62 on the throttle linkage 72 such that bridgement by switch contact 82 of the terminal at one end of the electrical lines 65 and 66 simultaneously energizes normally closed solenoid valve 59 to the opened position venting pressure fluid in conduit 58. Thus operation of the brake control arrangement causes brake fluid through conduit 79 to enter chamber 97 to act upon the variable relief valve 87 opposing the seating force thereof and to move switch contact 82 into bridgement of the terminal at one end of lines 65 and 66. The bridgement by switch contact 82 energizes solenoid 59 venting pressure fluid in conduit 58 to reduce the seating force of the variable relief valve 87 to its minimum value. Without energizing solenoid valve 59 when operating brake pedal 79, the load on the brake fluid in chamber 97 would be a greater value to open the relief valve 87. This brake fluid load would be felt by the operator in operating pedal 76 and would result consequently in operator fatigue.

The transmission control valve 33 comprises a housing 83 shown in cross sectional detail in FIGURE 2 in which the variable relief valve, comprising an annular member and valve spool with a coiled spring therebetween, is located in a valve chamber 86 between the connected ends of conduits 58 and 80. The valve chamber 86 comprises a plurality of series connecting chambers of different diameters with the large chamber 84a at the left end for slidable movement of an annular member 84 with a piston face at its left end for fluid contact of pressure fluid from conduit 58 and a projection member of reduced size 85 extending from the right face and integral therewith.

A valve spool member is slidable within the chamber 86 and includes at its left end a valve portion that comprises a conically shaped face 88 and at the other end a pair of spaced-apart annular lands 91 in sliding contact with the smallest chamber portion 93 and interconnected by a reduced portion 91'. The two ends of the valve spool member are interconnected by the reduced portion 91' and a projection member 89 extends from the left face of the valve portion and integral therewith. The projection members 85 and 89 provide assembly of a coiled spring 90 that urges and maintains alignment of the conically shaped face 88 of the valve portion against the edge of a shoulder of the annular groove 94 being formed to define a valve seat 92. The position of the variable relief valve shown in FIGURE 2 is that of minimum seating force of the conical shaped face 88 against the valve seat 92. Since the diameter of chamber 86 is greater than the diameter of chamber 93, pressure fluid in chambers 86 and 93 provides a net fluid force acting on valve portion 88 to oppose the seating forced of spring 90. If pressure fluid appears in conduit 58 from pump 15 when solenoid valve 59 is closed, annular member 84 is moved to the right in its chamber 84a against the right shoulder face 84b to shorten the length of the spring 90 and thereby increase the relief pressure to its maximum value and obtain the maximum seating force of the valve face 88 against the valve seat 92. However, if pressure fluid from the brake master cylinder appears in conduit 80 it enters the chamber portion 97 of chamber 93 to act against the right face of annular land 91 to reduce the seating force of valve face 88 against its valve seat 92. As aforementioned the operation of the brake control arrangement 75 simultaneously vents fluid pressure in conduit 58 through opened solenoid valve 59 thereby reducing pressure of spring 90 and consequently seating force of valve portion 88 to its minimum value. If the relief valve portion 88 is in the position shown in FIGURE 2 against its seat 92, pressure fluid from pump 15 flows from conduit 45 into chamber 86, passageway 96 to connect with the valve spool 115 shown in the neutral position through passageways 107 and 108. When the pressure fluid in chamber 86 acting on conical valve face 88 and left face of left land in chamber 93 in FIGURE 2 results in a net fluid force greater than the opposing seating force of spring 90, or when the brake pressure fluid appearing in chamber portion 97 acting on right face of right land 91 in combination with the net fluid force in chamber 86 results in a combined fluid force greater than the seating force of spring 90; relief valve 88 is moved to its open position away from valve seat 92 thereby communicating annular groove 94 with passageway 95 to by-pass pressure fluid to the reservoir 17. Annular lands 91 have O-rings associated therewith as shown in FIGURE 2 not indicated so as to prevent any passage of transmission fluid from conduit 45 or brake fluid from conduit 80. If there is any passage of fluid, annular groove 98 between annular lands 91 provides passage of either fluid to exhaust passageway 95 connected to conduit 32.

Reference is now drawn to the unloading valve of the transmission control valve 33 that comprises a pilot poppet valve and an unloading valve member. The pilot poppet valve 111 is urged to a closed position by spring 112 assembled on valve body projection portion 113 and poppet valve projection portion in a pilot chamber 111a. The pilot poppet valve 111 is located at one end of passageway 108. An unloading valve member 100 comprising a conical valve portion 102 at one end and an annular land 101 at the other end interconnected by a reduced portion is slidable in chamber 103. Chamber 103 is in free fluid communication with passageway 99. Unloading valve portion 102 is urged to its closed position against valve seat 106 by compressed spring 104 assembled on projection portions 102a and 105. Passageways 114 and 115 are in fluid communication with pilot poppet valve chamber 111a at one end with passageway 114 at the other end on fluid communication with passageway 95. The other end of passageway 115 is in fluid communication with chamber 103 adjacent the right face of annular land 101. Passageway 115 is of larger diameter than passageway 114, so that a sufficient net volume of pressure fluid in pilot chamber 111a can act upon right face of annular land 101 in FIGURE 2. If the valve spool 115 is in either travel speed position pressure fluid in passageway 110 from large pump 14 is blocked from passageway 131 by valve spool lands 117 and 118 and valve bore 123 are previously described, then check valve 109 is opened to combine the pressure fluid of both pumps 14 and 15 in parallel in passageways 96, 107 and 108. If the combined pressure fluid in passageway 108 acting on the closed pilot poppet valve 111 exceeds predetermined unloading value of pilot spring 112, pilot valve 111 is opened admitting combined pressure fluid from passageway 108. The admitted pressure fluid acts on right face of annular land 101 to open the unloading valve portion 102 thereby venting and unloading pressure fluid from large pump 14 in chamber 103 to return passageway 95. Venting of pressure fluid in chamber 103 through opened unloading valve portion 102 closes check valve 109 so that pressure fluid in chamber 96 is now only from small pump 15. Once pilot valve 111 closes, unloading valve portion 102 will close under action of spring 104, when pressure fluid acting on right face of annular land 101 exhausts sufficiently through pilot chamber passageway 114 to return passageway 95.

The end of the valve spool 115 associated with its annular land 116 is provided with a biasing assembly, not shown, of general construction known in the art. The biasing assembly serves to spring bias the valve spool 115 respectively to the neutral position.

The subject invention further includes two check valves 136 and 137 which are provided in the valve body of valve 33 respectively between the passageways 130 and 138, and passageways 132 and 139. Check valves 136 and 137 will permit fluid flow from passageway 138 or 139 into motor conduits 49 or 50 but will prevent any fluid flow therethrough in the opposite direction. These valves will prevent cavitation when the motor 47 may be operating faster than the pumps 14 and 15, such as in coacting.

Springs for the operation of the adjustable relief valve 87 and the unloading valve are selected in the following manner. With the valve spool 115 in neutral position, the throttle control arrangement 57 in idle position, and the brake control arrangement 75 in the non-operative position, spring 90 should be selected to provide a minimum value of seating force to seat the relief valve portion 88, such that the fluid pressure in pounds per square inch in chamber 86 times the flow of pump 15 is substantially equivalent to the maximum available horsepower of the engine minus the pressure in pounds per square inch that may be developed by the loader pump 13 and the flow thereof. The selected spring 90 is to further provide a gradual build-up to its maximum relief pressure without shifting shock when the valve spool 115 is shifted to one of the speed range positions. The coil spring 90 should be further selected so that when the throttle control arrangement 57 is moved to an operative position the adjustable relief pressure is increased to a maximum value for seating the relief valve portion 88 such that the fluid pressure in pounds per square inch in chamber 86 times the flow of pump 15 is substantially equivalent to the maximum available horsepower of the engine minus the pressure in pounds per square inch that may be developed by the loader pump 13 times the flow of pump 13. Spring 112 is selected to provide a seating force for pilot poppet valve 111, such that the pressure fluid in pounds per square inch in passageway 108 times the flow of pumps 14 and 15 is equivalent to the maximum engine horsepower which may be developed without stalling of the engine of the tractor. Selected pilot spring 112 provides a seating force that is less than the maximum seating force of relief valve spring 90. It should now be understood that spring 104 in providing a closing force for valve 102 against its seat 106 should be of a value not to exceed the fluid force from pilot chamber 111a acting upon annular land 101 in chamber 103 from passageway 115. Otherwise stalling of the tractor engine will occur in the traveling speed range. In one reduction to practice selected relief valve spring 90 having a minimum seating force corresponding to 125 pounds per square inch and a maximum seating force corresponding to 2500 pounds per square inch; and selected pilot poppet valve spring 112 having a seating force corresponding to 750 pounds per square inch was found to provide a satiscatory working arrangement. The requirements of the springs 90, 104 and 112 will be more clearly understood from the below described operation of the invention.

*Operation*

It must be understood that valve 33 is constructed so that chamber portions 95 are all interconnected and connect with groove 94. In the operation of the present invention, it is first assumed that the loader system is in a neutral position so that no pressure is developed by the loader pump 13, that the power steering circuit portion is in a non-operative position, that the throttle control arrangement 57 is in an idle position, that the brake control arrangement 75 is not being operated by the operator, and that the spool 115 is in the neutral position as shown in FIGURE 2. Fluid from the motor pump 13 will freely pass through conduit 18, flow divider 20a, return conduit 25a of the power steering circuit, conduit 18a into port 20 of loader valve 19, from port 25, through conduit 26, to the cooler 27, conduit 28, filter 29, and conduit 30 to conduit 31. Fluid from large displacement hydraulic pump 14 will flow through conduit 42, to chamber 103 and to passageway 99, passageway 110, annular grooves 127 and 126 to passageway 131, return conduit 32, conduit 31 and conduit 40 back to the pump 14. Because of a portion of the fluid from conduit 30 entering conduit 31, an identical portion will flow from conduit 32 and conduit 32a, and from conduit 25a and filter 26a of the power steering circuit back to the reservoir 17. Fluid from smaller displacement pump 15 will flow through conduit 45, chamber 86, passageway 96, passageways 107 and 108, return passageway 95 through fluid connected grooves 125, 124 and 123 and grooves 128 and 129, conduit 32, conduit 58 and conduit 41 back to pump 15. Similarly to the flow from pump 14, a portion of the fluid from pump 15 from conduit 32a and the fluid from conduit 25a of the power steering circuit will enter the reservoir 17 with the entrance of the remaining portion of the cooled and filtered fluid from conduit 30 entering conduit 31.

When the spool 115 is then moved outwardly to the right as shown in FIGURE 2, to the high speed forward driving position, the hydraulic fluid from both pumps 14 and 15 in passageway 107 will flow through annular groove 125, annular grooves 124 and 123, passageway 134, conduit 49, to the motor 47. Fluid from the motor 47 will flow through conduit 50, passageways 132 and 135, annular groove 129, passageway 95, conduit 32, conduit 31, and through conduits 40 and 41 back to pumps 14 and 15. The tractor will then be moved forwardly in a high or travel speed range. If the tractor wheels 51 or tractor encounter some obstruction or resistance to forward travel speed, the pressure fluid in passageway 108 acts upon the pilot poppet valve 111 to open the pilot valve when the fluid pressure in passageway 108 exceeds the predetermined unloading pressure of pilot spring 112 to prevent stalling of the engine at the maximum available horsepower. The pressure fluid from passageway 108 through opened pilot valve then acts upon the unloading valve member 100 to open unloading valve portion 102 to vent and unload pump 14. Venting of pump 14 closes check valve 109 so that small pump 15 flows only through passageway 107 to motor 47 operating in the forward travel speed. Assuming that the throttle control arrangement 57 remains in an operative position, the adjustable relief valve pressure remains adjusted to its maximum seating force of spring 90. If the obstruction or resistance continues on the tractor or tractor wheels 51 such that the pressure fluid in chamber 86 exceeds the maximum seating force of spring 90, then the relief valve 88 is opened relieving the obstruction or resistance load on small pump 15. Opened relief valve 88 directs pressure fluid from chamber 86 to return passageway 95 and return conduit 32 through annular groove 94. When the obstruction or resistance to the driven tractor wheels 51 diminishes, the tractor is gradually accelerated to the travel speed automatically by the transmission control valve 33 without shifting shock or loading shock. Closing of the relief valve 88 automatically restores full flow of small pump 15 to the motor 47 for the low speed range. Then closing of pilot valve 111, unloading valve portion 130 is closed automatically re-establishing large pump flow through passageway 99 to reopen check valve 109 to recombine pump flow of pumps 14 and 15 in parallel in passageway 96. Thus even though the valve spool 115 is positioned in the forward travel speed and the tractor or tractor wheels 51 encounter an obstruction or resistance, the transmission control valve 33 can be automatically disconnected and reconnected to drive the wheels through the action of the unloading valve 100 and the relief valve 87 without stalling of the engine at the maximum available horsepower and without loading or shifting shocks.

When the operator of the tractor intends to slow or stop the tractor in the forward travel speed range, the brake foot pedal 76 is actuated. During braking action, the brake pressure fluid acts on right land 91 of relief valve 87 and energizes solenoid valve 59 to vent pressure fluid in conduit 58 through closure of brake fluid switch 81. The action of venting pressure fluid in conduit 58 reduces the seating force of relief spring 90 to its minimum value. The purpose of reducing the seating force to the minimum value is to reduce the foot pressure necessary by the operator to open the relief valve 87. Since the minimum seating force of relief spring 90 is less than the seating force of unloading pilot spring 112, the combined flow of pumps 14 and 15 in the travel speed range is vented through the opened relief valve 88 since valve 109 in this instance is in the open position. After the operator releases his foot from brake pedal 76 and steps on the throttle pedal 67 the solenoid valve 59 is closed restoring seating force of relief spring to its maximum value. Then relief valve 88 is closed restoring full flow of pumps 14 and 15 for forward travel speed. Thus during the operation and non-operation of the brake control arrangement the transmission control valve 33 can be automatically disconnected and reconnected respectively without loading or shifting shocks in the forward travel speed position of the valve spool 115.

It should now be readily apparent that if the valve spool 115 is positioned in the low speed forward range and the brake control 75 is actuated, that the small pump 15 is vented only through brake-opened relief valve 88. As aforedescribed the flow of large pump 15 is directed from passageways 99, 110 to passageway 131 in view of free fluid communication between annular grooves 126 and 127 and spool reduced portion 121. Release of actuated brake control 75 closes variable relief valve 88 to its maximum seating force and re-establishes flow of small pump 15 to motor 47 without loading or shifting shock.

Since the low speed range of the tractor is the working speed range of the tractor, it should now be apparent that the operator can leave the valve spool 115 in the forward travel position of the transmission control valve 33 and operate the loader control valve 19. Thus when the loader pump 13 is loaded through operation of the loader valve 19, unloading valve portion 102 of the transmission control valve 33 automatically unloads the large pump 14 to prevent stalling of the engine and drive the tractor wheels in the low speed range. In the low speed range the maximum available horsepower of the engine is distributed between the loader pump 13 and the small transmission pump 15. In one operative reduction to practice, the small and large pump were designed for a pressure ratio of 2500/750 which equals 3.3 and the small pump had a displacement one-sixth of the total displacement, thus the propulsion power available was 55 percent of the maximum available horsepower for the low speed range. Therefore, 45 percent of the maximum available horsepower was provided for operation of the loader mechanism. If the operator in operating the loader control valve 19 intends to completely stop the tractor, the brake foot pedal 76 is actuated opening variable relief valve 88 to vent the flow of both pumps 14 and 15 as aforedescribed. Thus the subject invention provides the automatically shiftable transmission control valve 33 with a valve spool 115 that can be selectively positioned in the forward travel speed position to permit operation in the low speed range during operation of the loader control valve 19, and during loading and operator braking action without engine stalling at the maximum available horsepower.

If the valve spool 115 is moved to the left in FIGURE 2 to the high speed reverse driving position, hydraulic fluid in passageway 108 from pumps 14 and 15 will flow through annular groove 128, annular groove 129, passageway 135, and conduit 50 to the motor 47. From the motor 47, hydraulic fluid will flow through conduit 49, passageway 134, annular groove 124, passageway 95, conduit 32, and conduit 31 to the suction side of pumps 14 and 15. The tractor will then operate in a reverse direction in the high speed range, wherein the control valve 33 in the high speed range comprising the unloading valve 102 with the pilot poppet valve 111 and variable relief valve 88 including its operatively associated throttle control 57 and brake control 75 will function to prevent engine stalling at the maximum available horsepower in the same manner as described above for the forward direction.

The embodiments of the invention for which an exclusive property or privilege is claimed are defined as follows:

1. A hydrostatic arrangement for a tractor loader comprising a pair of pumps connectable to be driven by the engine of said tractor loader, one of said pair of pumps being of a substantially larger capacity than the other, a loader pump connectable to said loader and driven by said engine, a hydrostatic motor for driving traction means of said tractor loader, a control valve connected separately to said pair of pumps and said motor, valve means in said control valve selectively operable from a neutral position to one of two positions for connecting said pair of pumps in parallel to fluidly drive said hydrostatic motor in one of two directions, said valve means further selectively operable to the other of said two positions to vent one of said pair of pumps and to drive said motor in the one of the two directions with fluid from the other of said pair of pumps, unloading valve means being operable to automatically vent said one of said pair of pumps when the hydraulic pressure reaches a predetermined value which in combination with the flow of said pair of pumps corresponds substantially to all of the available horsepower of the engine, relief valve means operating subsequently to said unloading valve means, said relief valve means being operable to limit the hydraulic pressure of the other one of said pair of pumps to another predetermined value which in combination with the flow of said other one of said pumps corresponds substantially to one-half of the available horsepower of the engine while said loader is being operated at maximum power by said loader pump.

2. In a hydrostatic arrangement as claimed in claim 1, a control means operatively associated with said relief valve means, said control means providing for the rapid and substantial reduction of the relief pressure at said another predetermined value and subsequent gradual increase of the relief pressure to said another predetermined value, said control means providing shifting and acceleration of said motor without shock.

3. A hydrostatic transmission arrangement for a tractor loader comprising a pair of pumps connectable to be driven by the engine of said tractor loader, a loader pump connectable to said loader and driven by said engine, a hydrostatic motor for driving traction means of said tractor loader, valve means selectively operable from a neutral position for non-driving of said traction means to one position for connecting said pair of pumps in parallel to fluidly drive said motor, said valve means being further selectively operable to another position to drive said motor with fluid from one of said pair of pumps, unloading valve means operating responsive to the driving of said hydrostatic motor by fluid from said pair of pumps operating in parallel for preventing the stalling of said engine, and relief valve means operating responsive to fluid from one of said pair of pumps which is driving said motor to prevent the stalling of said engine, control means operatively associated with said control relief valve means, said means being operable to vary the relief pressure of said relief valve means.

4. In a hydrostatic transmission arrangement as claimed in claim 3, said control means comprising throttle control means and brake control means, said throttle control means being operable to increase the relief pressure of said relief valve means, said brake control means being operable to reduce said relief pressure of said relief valve means, said brake control means further being operatively associated with said throttle control means so that operation of said brake control means simulaneously prevents operation of said throttle control means.

5. A hydrostatic arrangement for a tractor loader comprising a pair of pumps connectable to be driven by the engine of said tractor loader, a loader pump connectable to said loader and driven by said engine, a hydrostatic motor for driving traction means of said tractor loader, valve means selectively operable from a neutral position for non-driving of said traction means to one position for connecting said pair of pumps in parallel to fluidly drive said hydrostatic motor, said valve means further selectively operable to another position to vent one of said pair of pumps and to drive said motor with fluid from the other of said pair of pumps, unloading valve means operating responsive to the driving of said hydrostatic motor by fluid from said pair of pumps operating in parallel for preventing the stalling of said engine, relief valve means operating responsive to fluid from the other of said pair of pumps for driving said motor to prevent the stalling of said engine when said loader pump is operating said loader, said relief valve means being variable from a minimum predetermined relief pressure to a maximum relief pressure, and said unloading valve means having an unloading pressure greater than said minimum relief pressure of said relief valve means.

6. A hydrostatic transmission arrangement for a tractor loader comprising a pair of pumps connectable to be driven by the engine of said tractor loader, a hydrostatic motor for driving traction means of said tractor loader, valve means selectively operable to a neutral position and non-driving of said traction means, said valve means further selectively operable to one position for connecting said pair of pumps in parallel to fluidly drive said hydrostatic motor and to another position for connecting one of said pumps to fluidly drive said hydrostatic motor and for venting the other of said pumps, unloading valve means operating responsive to the driving of said hydrostatic motor by fluid from said pair of pumps operating in parallel to develop a certain motor torque for preventing the stalling of said engine when said pair of pumps are absorbing substantially the maximum output torque of said engine, and relief valve means operating responsive to the driving of said hydrostatic motor by fluid from said one of said pumps for permitting said one of said pumps to absorb substantially less of the full output torque of said engine while developing a motor torque greater than said certain motor torque.

7. A hydrostatic transmission arrangement for a tractor loader comprising a pair of pumps connectable to be driven by the engine of said tractor loader, a loader pump connectable to said tractor loader and driven by said engine, a hydrostatic motor for driving traction means of said tractor loader, valve means selectively operable from a neutral position for non-driving of said traction means to one position for connecting said pair of pumps in parallel to fluidly drive said motor, said valve means being further selectively operable to another position to drive said motor with fluid from one of said pair of pumps, unloading valve means operating responsive to the driving of said hydrostatic motor by fluid from said pair of pumps operating in parallel to develop a certain motor torque for preventing the stalling of said engine when said pair of pumps are absorbing substantially the full output torque of said engine, relief valve means operating responsive to the driving of said hydrostatic motor by fluid from said one of said pumps for permitting said one of said pumps to absorb substantially less of the full output torque of said engine while developing a motor torque greater than said certain motor torque, throttle control means operatively associated with said relief valve means, said throttle control means being operable from an idle position to another position to vary the relief pressure of said relief valve means from a predetermined minimum value to a maximum value at a controlled rate, and said relief valve means when variable to said maximum value having a relief pressure substantially equal to less than the full output torque of said engine.

8. In a hydrostatic transmission arrangement as claimed in claim 7, a brake control means operatively associated with said throttle control means and said relief valve means, said brake control means being operable to operate said throttle control means and to reduce the relief pressure of said relief valve means to said minimum value.

9. A hydrostatic arrangement for a tractor loader comprising a pair of pumps connectable to be driven by the engine of said tractor loader, a loader pump connectable to said loader and driven by said engine, a hydrostatic motor for driving traction means of said tractor loader, valve means selectively operable from a neutral position to at least one travel position for connecting said pair of pumps in parallel to fluidly drive said hydrostatic motor, unloading valve means operating responsive to the driving of said hydrostatic motor by fluid from said pair of pumps operating in parallel for preventing the stalling of said engine when said pair of pumps are receiving substantially the maximum power of said engine, said unloading valve means venting one of said pumps to prevent engine stalling, relief valve means operating responsive to fluid from the other of said pair of pumps, said relief valve means relieving the pressure in said other of said pumps to prevent excessive use of the available power of the engine so that said loader may be operated by fluid from said loader pump, control means including a brake control means and a throttle control means operatively associated with said relief valve means to vary the relief pressure thereof, said throttle control means being operable to vary the relief pressure from a minimum value to a maximum value, said brake control means being operable to vary the relief pressure from the maximum value to the minimum value, said valve means being selectable to said one travel position to drive the traction means by said dual pumps such that operation of said throttle control means varies said relief valve pressure to its maximum value and automatically connects said pumps in parallel upon closure of said unloading valve means, and said brake control means being operable to vary the relief valve pressure to the minimum value to open said relief valve means to vent said dual pumps therethrough from said driven traction means without engine stalling at the maximum available horsepower, whereby said relief valve means with said control means and said unloading valve means provide acceleration and deceleration of said driven traction means while said selector valve means is positioned in travel speed without engine stalling at the maximum available horsepower.

10. A hydrostatic arrangement for a tractor loader comprising a pair of pumps connectable to be driven by the engine of said tractor loader, a loader pump connectable to said tractor loader and driven by said engine, a hydrostatic motor for driving traction means of said tractor loader, valve means selectively operable from a neutral position to one of the travel positions for connecting said pair of pumps in parallel to fluidly drive said hydrostatic motor, unloading valve means operating responsive to the driving of said hydrostatic motor by fluid from said pair of pumps operating in parallel for preventing the stalling of said engine when said pair of pumps are receiving substantially the full power of said engine, said unloading valve means venting one of said pumps to prevent engine stalling, relief valve means operating responsive to fluid from the other of said pair of pumps, said relief valve means relieving the pressure in said other of said pumps to prevent excessive use of the avaliable power of the engine so that said loader may be operated by fluid from said loader pump, said valve being selectable to one of said travel positions to drive the traction means by fluid from said dual pumps whereby said relief valve means and said unloading valve means provide acceleration and deceleration of said driven traction means while said selector valve means is positioned in travel speed without engine stalling at the available horsepower.

11. A hydrostatic arrangement for a tractor loader comprising a pair of pumps connectable to be driven by the engine of said tractor loader, one of said pair of pumps being of a substantially larger capacity than the other, a loader pump connectable to said tractor loader and driven by said engine, a hydrostatic motor for driving traction means of said tractor loader, valve means selectively operable from a neutral position to at least one of the travel positions for connecting said pair of pumps in parallel to fluidly drive said hydrostatic motor, unloading valve means operating responsive to the driving of said hydrostatic motor by fluid from said pair of pumps operating in parallel for preventing the stalling of said engine when said pair of pumps are receiving substantially the full power of said engine, said unloading valve means venting one of said pumps to prevent engine stalling, relief valve means operating responsive to fluid from the other of said pair of pumps, said relief valve means relieving the pressure in said other of said pumps to prevent excessive use of the maximum available power of the engine, control means operatively associated with said relief valve means to vary the relief pressure thereof, and said valve means being selectable to one of said travel positions to drive the traction means such that operation of said control means vents said pair of pumps through said opened relief valve means to automatically disconnect said driven traction means without engine stalling at the maximum available horsepower.

12. A hydrostatic arrangement for a tractor loader comprising a pair of pumps connectable to be driven by the engine of said tractor loader, a loader pump connectable to said tractor loader and driven by said engine, a hydrostatic motor for driving traction means of said tractor loader, valve means selectively operable from a neutral position to at least one of the travel positions for connecting said pair of pumps in parallel to fluidly drive said hydrostatic motor, unloading valve means operating responsive to the driving of said hydrostatic motor by fluid from said pair of pumps operating in parallel for preventing the stalling of said engine when said pair of pumps are receiving substantially the full power of said engine, said unloading valve means venting one of said pumps to prevent engine stalling, relief valve means operating responsive to fluid from the other of said pair of pumps, said relief valve means relieving the pressure in said other of said pumps to prevent excessive use of the maximum available power of the engine, operator control means operatively associated with said relief valve means to vary the relief pressure thereof, and said valve means being selectable to one of said travel positions to drive the traction means such that operation of said operator control means vents said pair of pumps through said opened relief valve means to automatically disconnect said driven traction means without engine stalling at the maximum available horsepower.

13. A hydrostatic arrangement for a tractor comprising a pair of pumps connectable to be driven by the engine of said tractor, a hydrostatic motor for driving traction means of said tractor, control valve means selectively operable from a neutral position to a travel position to connect said pumps in parallel and said motor to fluidly drive the same and said traction means, unloading valve means operating responsive to the driving of said hydrostatic motor by fluid from said pair of pumps in parallel for preventing engine stalling when said pair of pumps are receiving full engine horsepower, relief valve means operating responsive to fluid from one of said pair of said pumps to relieve the load thereof at less than maximum available engine horsepower, and operator control means operatively associated with said relief valve means to vary the relief pressure thereof.

14. A hydrostatic arrangement for a tractor loader comprising a pair of pumps connectable to be driven by the engine of said tractor loader, a loader pump connectable to said tractor loader and driven by said engine, a hydrostatic motor for driving traction means of said tractor, control valve means selectively operable from a neutral position to another position to connect said pumps in parallel and to said motor to fluidly drive said hydrostatic motor and said traction means, unloading valve means operating responsive to the driving of said hydrostatic motor by fluid from said pair of pumps for preventing engine stalling when said pair of pumps are receiving full engine horsepower, and relief valve means operating responsive to fluid from one of said pair of said pumps to relieve the load thereof at less than maximum available engine horsepower.

15. A hydrostatic arrangement for a tractor comprising a pair of pumps connectable to be driven by the engine of said tractor, a hydrostatic motor for driving traction means of said tractor, valve means selectively operable from a neutral position to another position to connect said pumps to said motor to fluidly drive said hydrostatic motor and said traction means, unloading valve means operating responsive to the driving of said hydrostatic motor by fluid from said pair of pumps for preventing engine stalling when said pair of pumps are receiving full engine horsepower, relief valve means operating responsive to fluid from one of said pair of said pumps to relieve the load thereof at less than maximum available engine horsepower and operator control means operatively associated with said relief valve means to adjust the relief pressure thereof during driving of said traction means.

16. A hydrostatic arrangement for a tractor in accordance with claim 15, wherein said operator control means includes a throttle member connected thereto.

17. A hydrostatic arrangement for a tractor in accordance with claim 16, said operator control means includes a brake member connected thereto.

18. A hydrostatic transmission arrangement for a tractor loader comprising a pair of pumps connectable to be driven by the engine of said tractor loader, a loader pump connectable to said loader and driven by said engine, a hydrostatic motor for driving traction means of said tractor loader, valve means selectively operable from a neutral position for non-driving of said traction means to one position for connecting said pair of pumps in parallel to fluidly drive said motor, said valve means being further selectively operable to another position to drive said motor with fluid from one of said pair of pumps, unloading valve means operating responsive to the driving of said hydrostatic motor by fluid from said pair of pumps operating in parallel for preventing the stalling of said engine, and relief valve means operating responsive to fluid from one of said pair of pumps which is fluidly driving said motor to prevent the stalling of said engine.

References Cited by the Examiner
UNITED STATES PATENTS

| | | | |
|---|---|---|---|
| 2,789,648 | 4/57 | Huffman | 60—53 |
| 2,833,116 | 5/58 | Rush | 60—53 |
| 2,879,612 | 3/59 | Schultz et al. | 60—52 X |
| 2,959,923 | 11/60 | Shook | 60—97 |
| 3,005,562 | 10/61 | Shaffer | 60—52 |
| 3,037,354 | 6/62 | Tennis | 60—52 |
| 3,043,107 | 7/62 | Magnus | 60—53 X |

JULIUS E. WEST, *Primary Examiner.*

EDGAR W. GEOGHEGAN, *Examiner.*